United States Patent [19]

Sigler

[11] Patent Number: 4,989,819

[45] Date of Patent: Feb. 5, 1991

[54] INDICIA DISPLAY DEVICE

[76] Inventor: Shimon Sigler, 40 Kadish Luz Str., Kiryat Motzkin 26406, Israel

[21] Appl. No.: 376,494

[22] Filed: Jul. 7, 1989

[30] Foreign Application Priority Data

Jul. 10, 1986 [IL] Israel ................................. 87057

[51] Int. Cl.⁵ ............................................ A47G 1/24
[52] U.S. Cl. ..................................... 248/476; 40/630; 40/643
[58] Field of Search ............... 248/205.3, 467, 493, 248/316.7, 542; 211/45; 24/304, 481, DIG. 11, 457; 40/594, 626, 630, 638, 643, 644, 661

[56] References Cited

U.S. PATENT DOCUMENTS

| 873,099 | 12/1907 | Shepard | 24/563 X |
|---|---|---|---|
| 1,707,723 | 4/1929 | Hulsebos | 40/630 |
| 1,996,288 | 4/1925 | Galt | 40/630 |
| 2,081,095 | 5/1937 | Mull | 248/467 |
| 3,102,739 | 9/1963 | Larson | 24/304 X |
| 3,309,052 | 3/1967 | Borisof | 24/304 X |
| 3,533,178 | 10/1970 | Strohmaier | 40/643 |
| 3,991,495 | 11/1976 | Wilson | 40/594 X |
| 4,069,606 | 1/1978 | Shevin | 40/643 |
| 4,429,015 | 1/1984 | Sheptak | 40/630 X |
| 4,526,405 | 7/1985 | Hattemer | 40/630 X |

FOREIGN PATENT DOCUMENTS 2122012 1/1984 United Kingdom ................. 40/644

Primary Examiner—J. Franklin Foss
Attorney, Agent, or Firm—Browdy and Neimark

[57] ABSTRACT

An indicia display device for displaying indicia preferably through a transparent vitreous like surface to which it is to be attached and comprising a planar element having at least one exposed surface portion formed of a plastics material having maximal adhesive properties with respect to the vitreous like surface, the opposite surface portion of the planar element having associated therewith retaining means for the indicia to be displayed.

7 Claims, 2 Drawing Sheets

FIG. 1
FIG. 2
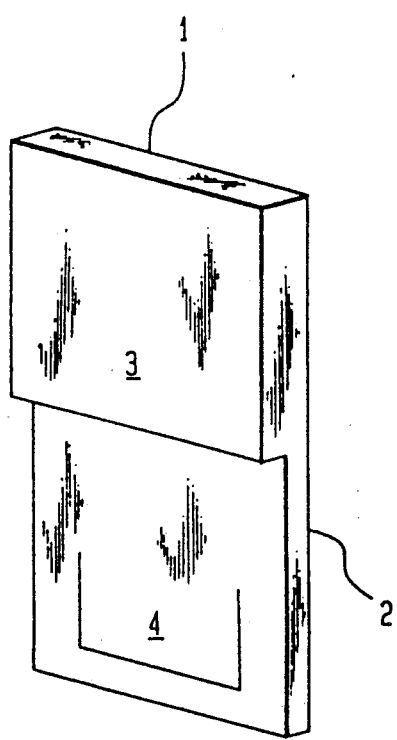
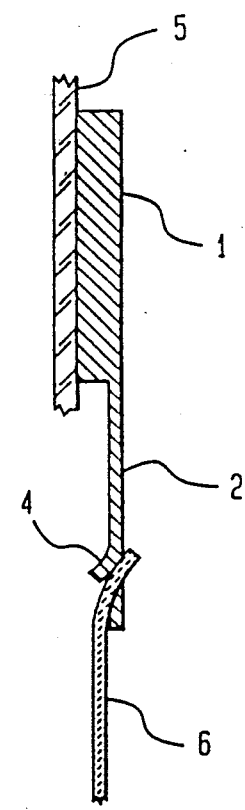
FIG. 3
FIG. 4
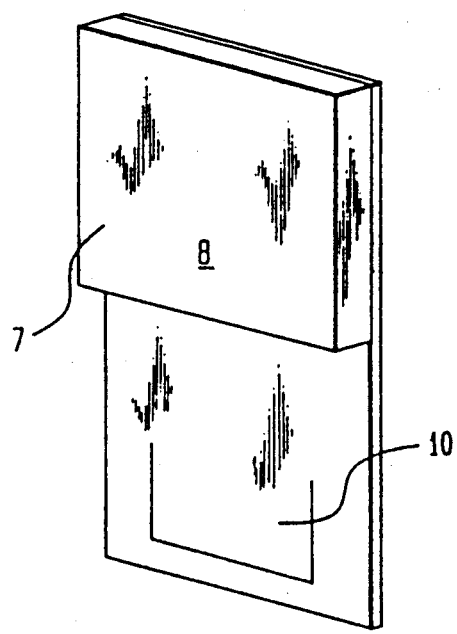
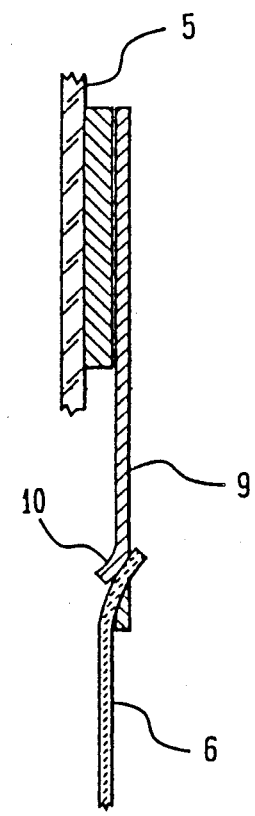

INDICIA DISPLAY DEVICE

FIELD OF THE INVENTION

This invention relates to an indicia display device capable of being readily and releasably attached to any smooth vitreous surface so as to display indicia associated with the device. The invention is particularly, but not exclusively, concerned with a device designed to be releasably attached to a transparent, vitreous-like surface such as, for example, a glass window or the like so as to facilitate ready observation of the indicia associated with the device through the window or the like.

BACKGROUND OF THE INVENTION

There are many occasions when it is desired to display for viewing through a glass pane or the like, indicia of differing kinds. Thus, the common practice of adhesively attaching a notice or the like to the inner surface of a window, pane clearly carries with it the disadvantage of difficulty of easily removing the adhered notice from the window pane. Alternative modes of displaying a notice to be viewed through a window pane such as, for example, a car parking ticket which must be clearly visible through the closed window of a motor vehicle, involve the use of mechanical means for ensuring that the notice is retained within the vehicle in a position so that it is readily visible from the outside.

BRIEF SUMMARY OF THE INVENTION

It is an object of the present invention to provide a new and improved indicia display device in which the above-referred-to disadvantages are substantially reduced or overcome.

According to the present invention there is provided an indicia display device comprising a planar element; at least one exposed surface portion of said planar element being formed of a plastics material having maximal adhesive properties with respect to a vitreous like surface to which it is to be attached; an opposite portion of said planar element; and retaining means for retaining indicia to be displayed and associated with said opposite surface.

The present invention is based on the discovery that with certain plastic materials, such as, for example, materials having elongated, substantially unidirectional polymeric chains of substantially maximal flexibility, these surfaces exhibit maximal adhesive properties with respect to a vitreous-like surface against which it is pressed, in such a way that the plastic material remains adhesively attached to the vitreous-like surface, resisting any transversely directed pressure exerted thereon so as to displace it with respect to the vitreous-like surface, but being nevertheless easily removed from the vitreous-like surface by the exertion of a lifting pressure thereon. It is believed that the adhesion of such plastic elements to the vitreous-like surface arises out of electrostatic forces which are developed between the contiguous surfaces and/or a vacuum-like effect which is developed in the micro pores present in the contiguous surfaces.

In accordance with one preferred embodiment of the invention, the planar element is substantially transparent and the retaining means is formed integrally with the opposite surface portion. Thus, the indicia can be applied directly to the opposite surface portion, or the retaining means with the indicia applied thereto can be secured to the opposite surface portion.

In accordance with a further preferred embodiment of the present invention, the panel is provided with an extension projecting therefrom and slotted to form a resiliently displaceable tongue adapted to retain an inserted indicia carrying medium such as, for example, a parking ticket.

BRIEF SUMMARY OF THE DRAWINGS

For a better understanding of the present invention and to show how the same may be carried out in practice, reference will now be made to the accompanying drawings, in which:

FIG. 1 is a perspective view of a first form of indicia display device in accordance with the present invention;

FIG. 2, is a cross-sectional view of the device shown in FIG. 1 when attached to a vitreous surface and when having attached thereto an indicia carrying medium;

FIG. 3 is a perspective view of a second form of indicia display device in accordance with the present invention;

FIG. 4 is a cross-sectional view of the device shown in FIG. 3 when attached to a vitreous surface and when having attached thereto an indicia carrying medium;

DETAILED DESCRIPTION OF PREFERRED EMBODIMENTS

Figure 5:
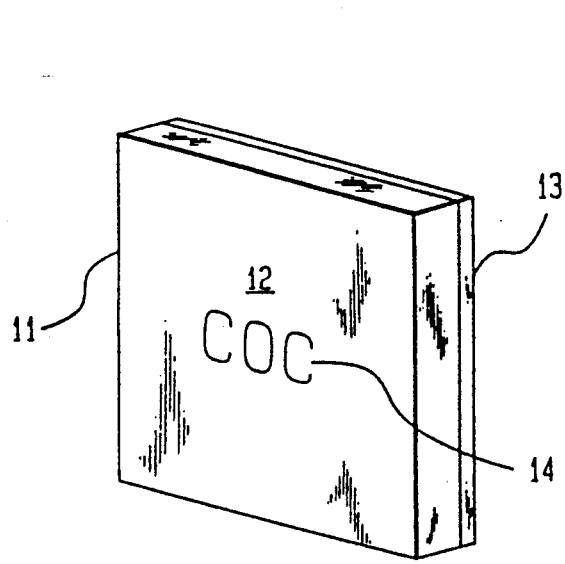
FIG. 5 is a perspective view of a third form of indicia display device in accordance with the present invention.

In all the embodiments of the indicia display device now to be described, a planar element is provided having at least one exposed surface portion formed of a plastics material having maximal adhesive properties with respect to a vitreous-like surface to which it is to be attached, the material consisting preferably of elongated, substantially unidirectional polymeric chains of substantially maximum flexibility. A suitable plastics material of this kind is that known under the trade name ASTRAGLAS. Such plastics material will hereinafter be referred to as a plastics material of the kind specified.

As seen in FIG. 1 of the drawings, an indicia display device is formed entirely of a plastics material of the kind specified and comprises an upper planar element 1 and a lower depending planar element 2 which is of substantially lesser thickness than the upper element 1 and which is inset with respect to an outer surface 3 of the element 1.

Formed in the lower depending element 2 is a flexible cut-out tongue 4.

In use, and as shown in FIG. 2 of the drawings, the surface 3 of the element 1 is firmly pressed against a vitreous surface 5, such as, for example, the inside surface of a motor vehicle window to which it effectively adheres against pulling forces directed in the plane thereof. This adhesion is believed to be due to electrostatic forces developed between the adhering surfaces and/or alternatively a vacuum generated in the micropores of the adhering surfaces.

An indicia bearing medium 6, such as, for example, a parking ticket, can then be effectively retained between the outwardly extended tongue 4 and the remaining portions of the lower element 2. In this way, the indicia bearing means is readily visible through the glass pane or the like.

In the alternative embodiment shown in FIGS. 3 and 4 of the drawings, a planar plastics element formed of a plastics material of the kind specified 7 having an outer surface 8, has adhesively bonded to a rear surface thereof an indicia retaining means comprising a panel 9 which extends below the element 7 and has formed therein a cut-out tongue 10. The use of the device shown in FIGS. 3 and 4 of the drawings corresponds to the use described in connection with the device shown in FIGS. 1 and 2 of the drawings for the retention and display of an indicia bearing element 6.

Figure 6:
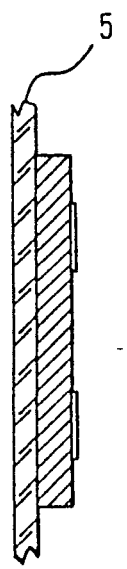
FIG. 6 is a cross-sectional view of the device shown in FIG. 5 when attached to a vitreous surface.

In the embodiment shown in FIGS. 5 and 6 of the drawings, a plastics planar element 11, having an outer surface 12 has adhesively bonded to a rear surface thereof an indicia bearing medium 13 so that the indicia 14 is readily visible through the planar element 11. The device thus formed is adhesively secured by pressure in the manner described above to a vitreous surface 5 so that the indicia 14 are readily visible through the vitreous surface 5.

As an alternative to the adhesive bonding to the rear surface of the planar element of the indicia-bearing material, the indicia itself can be suitably imprinted, engraved or the like on the inner surface of the planar element so as to be readily visible through the element and through the vitreous surface 5 to which the element is to be attached.

Figure 7:
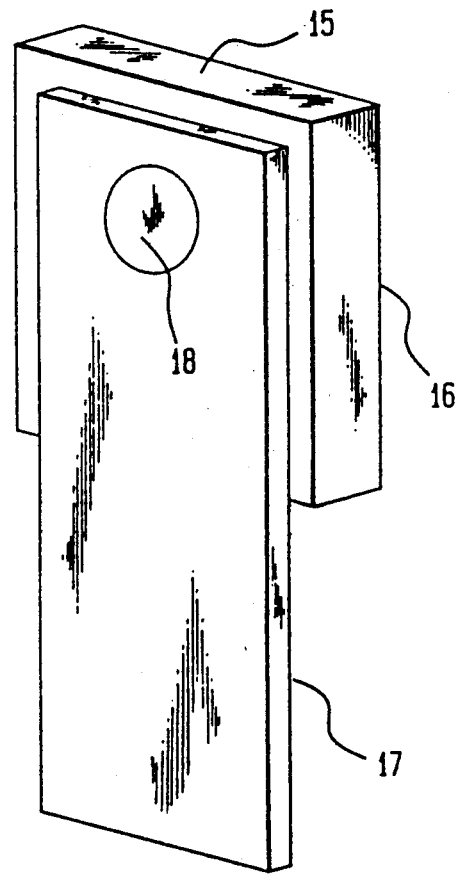
FIG. 7 is a perspective of a fourth form of indicia display device in accordance with the present invention, having attached thereto an indicia carrying medium.
Figure 8:
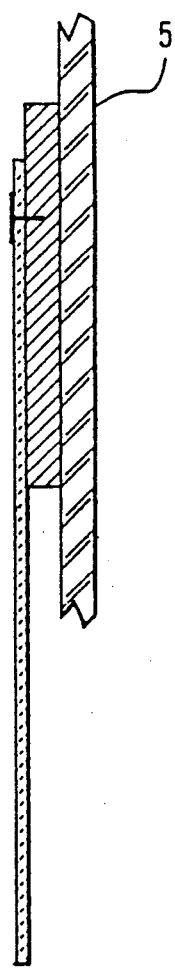
FIG. 8 is a cross-sectional view of the device shown in FIG. 7 when attached to a vitreous surface.

In the embodiment shown in FIGS. 7 and 8 of the drawings, a planar plastics element 15 having an outer exposed surface 16 and formed of a plastics material of the kind as specified, has the indicia bearing medium 17 attached thereto by a simple thumb tack 18, or the like. The planar element 15 is thereupon adhesively secured at its exposed surface 16 to a vitreous-like surface such as, for example, a window or ceramic tile or the like, and the possibility of attaching documents, messages or other indicia-bearing elements 2 the element 16 by means of a simple thumb tack or the like allows for the ready availability and storage of messages or the like.

I claim:

1. An indicia display device comprising a planar element; at least one exposed surface portion of said planar element being flat and formed of a plastics material having elongated, substantially unidirectional polymeric chains of substantially maximum flexibility, said plastics material having maximal adhesive properties with respect to a vitreous like surface to which it is pressed so as to be attached over substantially all of said exposed surface portion, said attachment being easily releaseable by exertion of a lifting pressure thereon; an opposite surface portion of said planar element; and retaining means for indicia to be displayed in a direction facing in the same direction as said exposed surfaces associated with said opposite surface.

2. A display device according to claim 1 wherein said planar element is substantially transparent and wherein said retaining means is integral with said opposite surface portion.

3. A display device according to claim 2 wherein said planar element is substantially transparent and said indicia are applied directly to said opposite surface portion.

4. A display device according to claim 1 wherein said retaining means with said indicia applied thereto are secured to said opposite surface portion.

5. A display device according to claim 1 wherein said retaining means is integral with said opposite surface and constitutes an extension of said element and is slotted to form a resiliently displaceable tongue adapted to retain an inserted indicia carrying medium.

6. A display device according to claim 1 wherein said retaining means is constituted by a panel attached to said opposite surface portion and provided with an extension projecting beyond said element and slotted to form a resiliently displaceable tongue adapted to retain an inserted indicia carrying medium.

7. A display device according to claim 1 wherein said information carrying medium is mechanically and releasably secured to said opposite surface portion by said information retaining means.

* * * * *